United States Patent [19]
Biagiotti

[11] Patent Number: 6,053,304
[45] Date of Patent: Apr. 25, 2000

[54] STORAGE UNIT WITH RATES OF ADVANCE DEPENDENT ON UPSTREAM AND DOWNSTREAM RATES

[75] Inventor: Guglielmo Biagiotti, Lucca, Italy

[73] Assignee: Fabio Perini S.p.A., Lucca, Italy

[21] Appl. No.: 08/930,757

[22] PCT Filed: Apr. 16, 1996

[86] PCT No.: PCT/IT96/00075

§ 371 Date: Oct. 8, 1997

§ 102(e) Date: Oct. 8, 1997

[87] PCT Pub. No.: WO96/33114

PCT Pub. Date: Oct. 24, 1996

[30] Foreign Application Priority Data

Apr. 21, 1995 [IT] Italy .................................. FI95A0075

[51] Int. Cl.$^7$ .................................................. B65G 17/12
[52] U.S. Cl. ...................... 198/794; 198/812; 198/464.3; 198/444
[58] Field of Search .................................. 198/794, 812, 198/464.3, 444

[56] References Cited

U.S. PATENT DOCUMENTS

| | | | |
|---|---|---|---|
| 2,932,376 | 4/1960 | Millington | 198/812 |
| 3,447,707 | 6/1969 | Furst | 198/444 |
| 3,506,105 | 4/1970 | Stauber | 198/812 |
| 3,871,511 | 3/1975 | Wentz et al. | 198/464.3 |
| 4,024,381 | 5/1977 | Fluck | 198/444 |
| 4,142,626 | 3/1979 | Bradley | 198/812 |
| 4,162,723 | 7/1979 | Kupper | 198/444 |
| 4,168,776 | 9/1979 | Hoeboer | 198/812 |
| 4,231,470 | 11/1980 | Parkes | 198/812 |
| 4,650,264 | 3/1987 | Dahnert | 198/794 |
| 5,339,942 | 8/1994 | Gasser et al. . | |

FOREIGN PATENT DOCUMENTS

| | | |
|---|---|---|
| 0 035 813 | 9/1981 | European Pat. Off. . |
| 0 451 398 | 10/1991 | European Pat. Off. . |
| 2 576 586 | 8/1986 | France . |
| 2 617 136 | 12/1988 | France . |
| 25 53 132 | 6/1977 | Germany . |
| 1 437 381 | 5/1976 | United Kingdom . |
| 1 531 622 | 11/1978 | United Kingdom . |
| 2 091 198 | 7/1982 | United Kingdom . |

OTHER PUBLICATIONS

"Tissue Converting in the 1990's", *Tissue Issues*, by R. Siebert (Niagara Lockport) 1990 (6 p.).

Drawing of Paper Machine Converting Company (PCMC) Machine R 00697 With Order Acknowledgement Form Dated 02/28/1979 and 07/16/1979.

*Primary Examiner*—Christopher P. Ellis
*Assistant Examiner*—Joe Dillon, Jr.
*Attorney, Agent, or Firm*—Breiner & Breiner

[57] ABSTRACT

A storage unit for the temporary storage of rolls, arranged between a first section and a second section of a production line, is described which includes an endless flexible member defining a closed path within the storage unit and bearing a plurality of seats for the rolls, the seats being subdivided into a first group of empty seats and a second group of full seats; an input feeder for controlled distribution of rolls arriving from the first section to the seats of the first group; an output feeder for controlled discharge of rolls from the seats of the second group toward the second section; a first motor for advancing the seats of the first group toward the input feeder and; a second motor for advancing the seats of the second group toward the output feeder. The first and second motors have first and second independently adjustable continuous speeds, respectively. Further, the first and second motors move the flexible member at a continuous but variable speed. The first and second speeds are dependent on the rate of roll arrival from the first section and the rate of roll request from the second section, respectively.

6 Claims, 5 Drawing Sheets

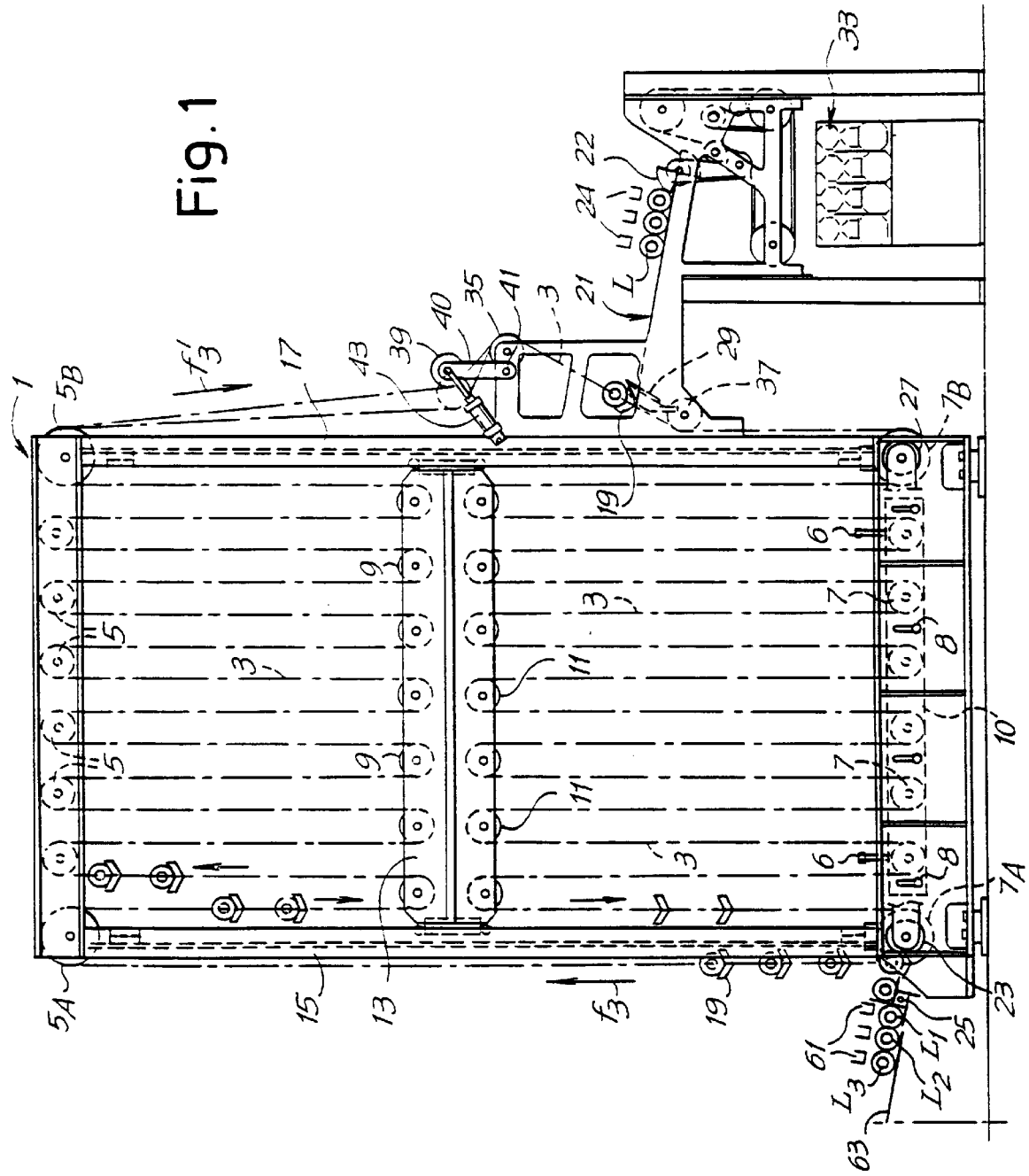

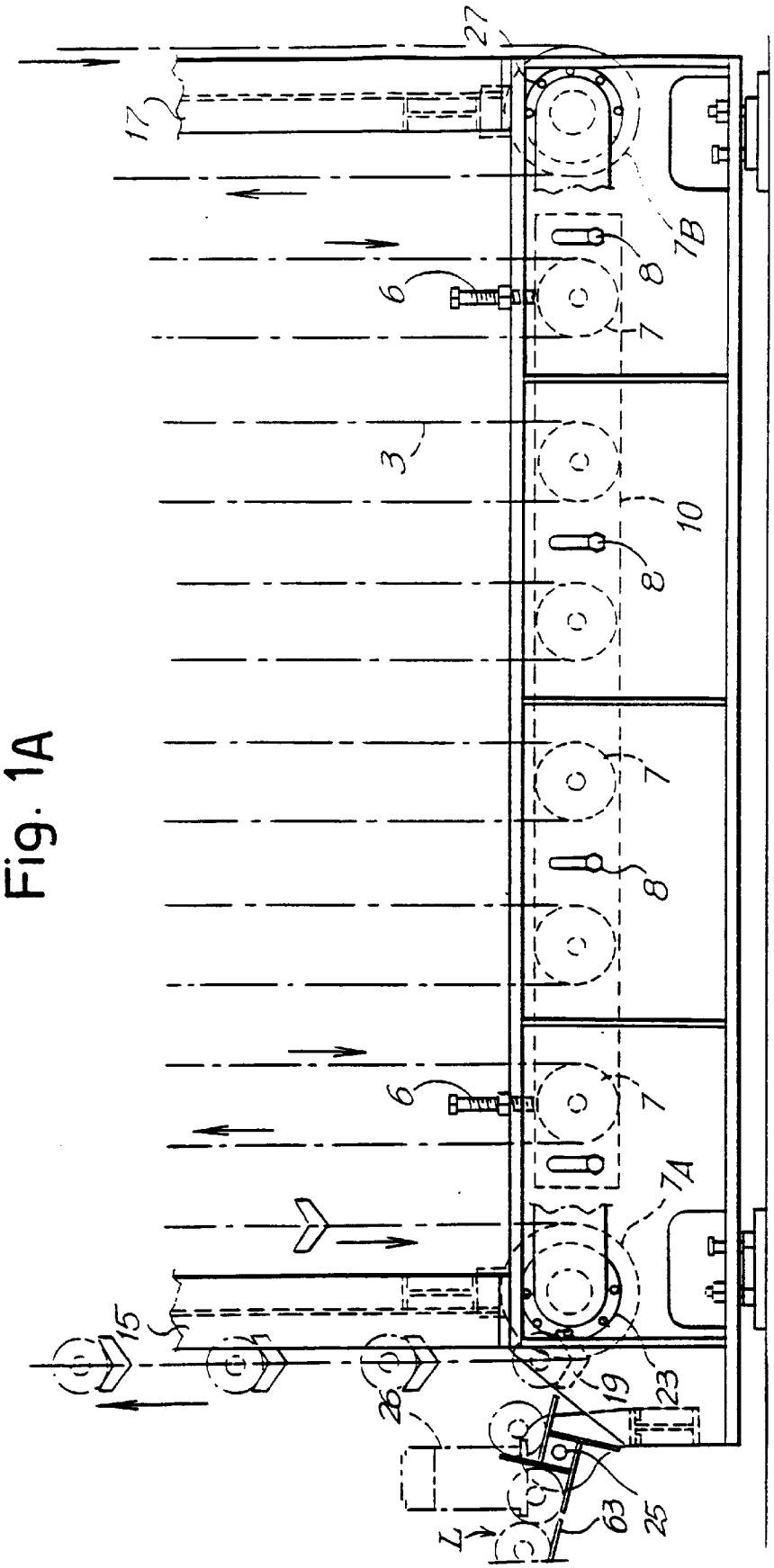

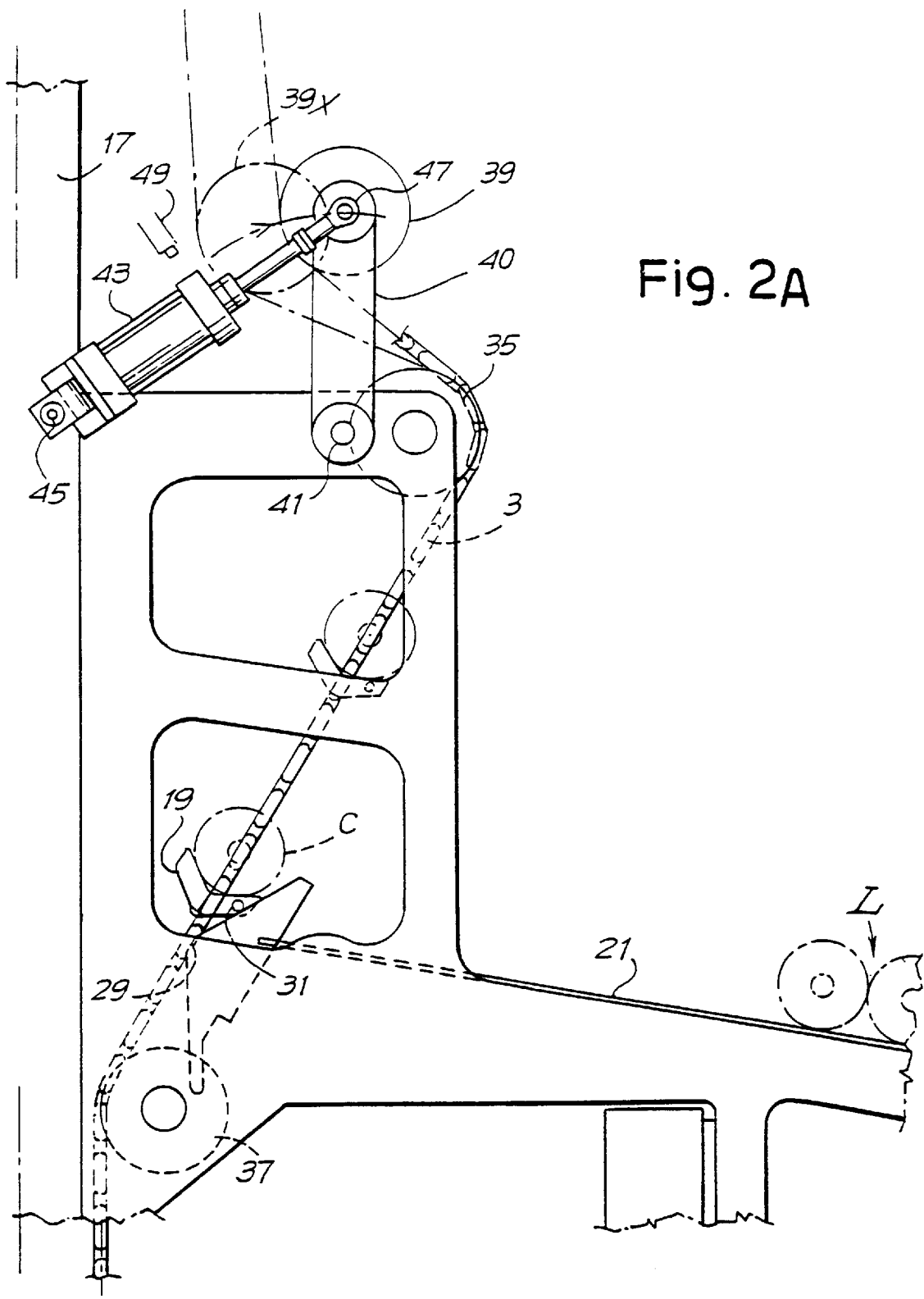

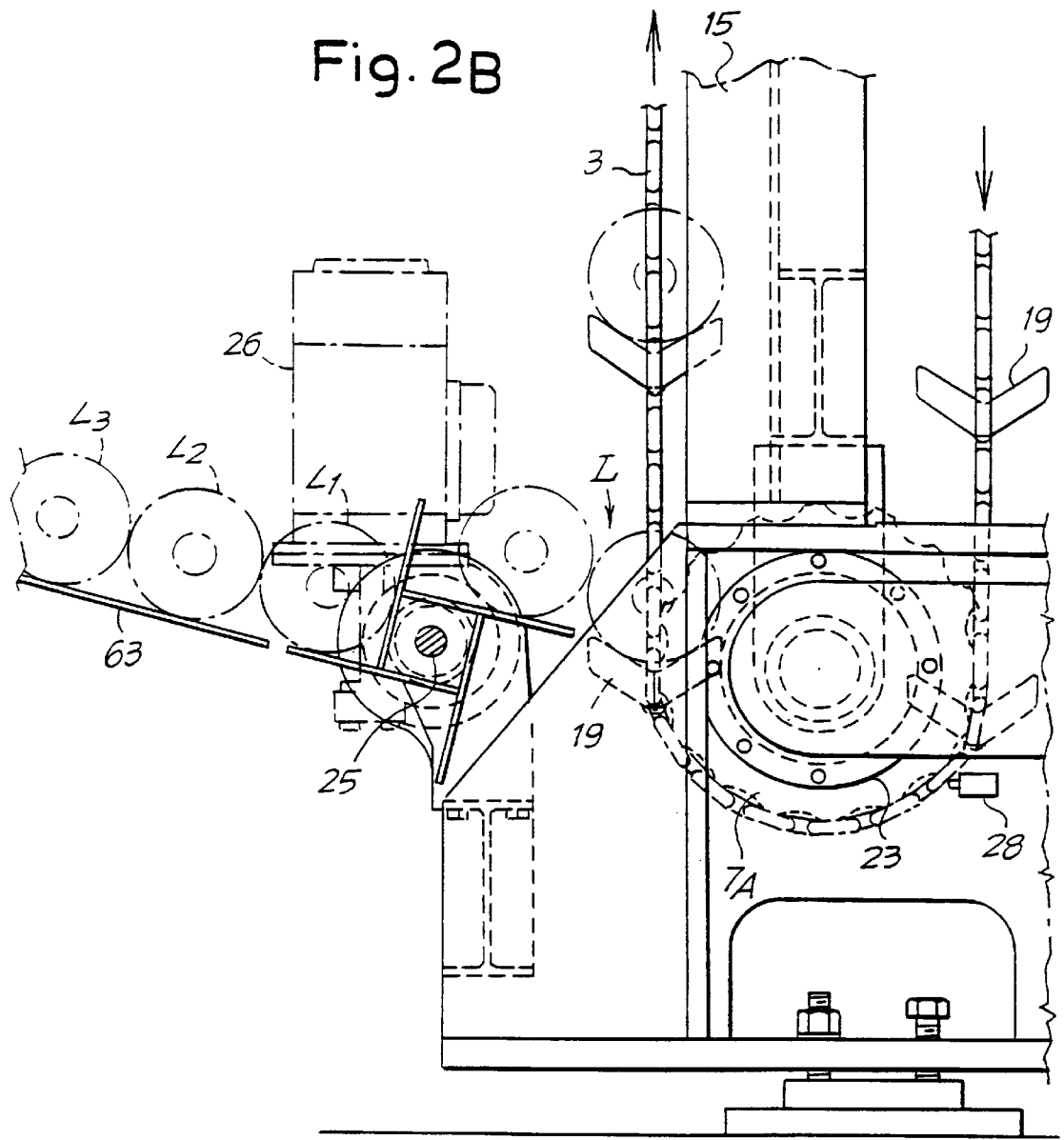

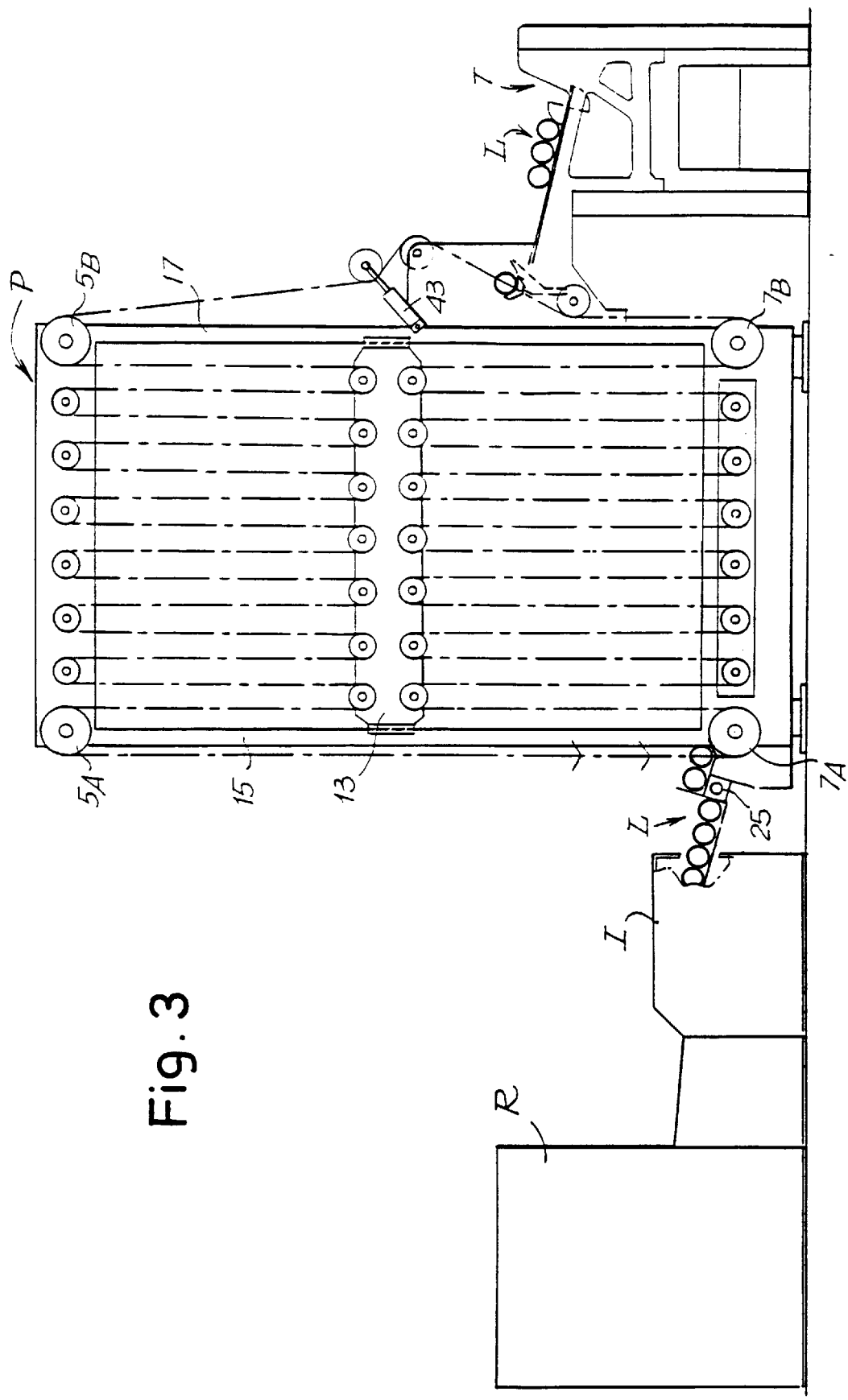

6,053,304

STORAGE UNIT WITH RATES OF ADVANCE DEPENDENT ON UPSTREAM AND DOWNSTREAM RATES

TECHNICAL FIELD

The invention relates to a storage unit for the temporary storage of rolls or logs of rolled up band-shaped material, arranged between a first section and a second section of a production or conversion line.

More particularly, the invention relates to an intermediate storage unit of the type comprising: input means for the distribution in the storage unit of rolls arriving from said first section, output means for the controlled discharge of rolls from the storage unit towards said second section, an indefinite flexible member bearing a plurality of seats for said rolls, said seats being subdivided into two groups, of full seats and of empty seats respectively, and two motor units, for the advance of the seats of the first group towards the output means and of the seats of the second group towards the input means.

STATE OF THE ART

Temporary accumulation storage units of this type are described for example in the U.S. Pat. Nos. 4,142,626 and 4,168,776. These are normally used in paper conversion lines, in which, from a reel of paper of large diameter, small rolls of toilet paper, all-purpose towels and similar products are formed, which are packed in individual or multiple packagings. In these conversion lines, the initial reel of paper is unrolled and rolled up again, in a so-called re-reeling machine, to form logs or rolls of a height equal to the height of the reel and of a diameter equal to the diameter of the finished product. The logs thus obtained have to be closed by means of gluing of the free end in a gluing machine arranged downstream of the re-reeling machine. Successively, each log or roll is sent to a cropper to be cut perpendicularly to its own axis to obtain small rolls of desired height.

Arranged between the gluing machine (or a number of gluing machines in parallel) and the cropper (or a number of croppers in parallel) is a storage unit for the temporary accumulation of the glued rolls which makes it possible to free the production rates of the re-reeling machine and of the gluing machine (or of the gluing machines) from that of the cropper or of the croppers. The storage unit has a pair of parallel chains forming an indefinite flexible member bearing a plurality of oscillating seats or troughs which receive and discharge the rolls.

The flexible member of the accumulation storage unit, constituted by a pair of parallel chains lying in two vertical planes on the two sides of the storage unit, are typically guided between series of guide wheels, some of which have a fixed axle and others have a movable axle, to allow a variation in the number of full and empty seats respectively. The number of full seats varies in relation to the number of empty seats according to the frequency of arrival of rolls from the production section upstream, and to the frequency of discharge of the rolls towards the section downstream. In traditional devices, the movement of the flexible member is of intermittent type, both in the input zone and in the output zone. The actuation of the input and output motor units is brought about respectively by the arrival of a roll from the gluing machine or by the request for one or a number of rolls simultaneously by the cropper. This intermittent movement causes a series of disadvantages, due mainly to the great dynamic stresses caused by the starts and by the stops of the flexible member and of the full and empty seats.

The control of the advance of the flexible member is particularly important. In fact, it is necessary to ensure that all the seats or troughs of the storage unit, on passage from the charging station, are filled, without leaving empty seats intercalated with full seats. The presence of an empty seat between two full seats may bring about the absence of a roll in one of the channels of the cropper and therefore an unbalance in the section of the line downstream, with consequent serious disadvantages in the packaging machines positioned downstream of the cropper. Correct functioning of the accumulation storage unit is therefore essential to avoid blockages of the line with consequent loss of production and mechanical disadvantages as a result of the necessity of stopping and restarting mechanical members of great mass and therefore with great inertia. Given that modern paper conversion lines work at a speed which can reach 1000 m/min, with a band of paper which may have a width of 2–5 m, with production rates up to 35 rolls a minute, a stoppage, even short, of the line means a considerable loss of production.

AIMS OF THE INVENTION

One aim of the present invention is that of eliminating the disadvantages of traditional systems and in particular of reducing the mechanical stresses on the structure of the storage unit.

A further aim of the present invention is that of controlling the movement of the flexible member both in the input zone and in the output zone so as to optimize the functioning of the line according to the rate of the gluing machine and of the cropper, even when there are great variations in the output frequency of the rolls from the gluing machine and the feed frequency of rolls to the cropper.

A further aim of the present invention is that of eliminating the risk of individual empty seats being intercalated between full seats.

SUMMARY OF THE INVENTION

These and other aims and advantages, which will be clear to experts in the field from reading the text which follows, are achieved with an accumulation storage unit of the type mentioned above, in which the two motor units move the flexible member with a continuous motion, and in which the speed of advance of the two groups of seats is determined by the rate of said first and said second section respectively.

In essence, contrary to what takes place in traditional systems, according to the invention provision is made for keeping the flexible member in continuous motion (at a normally non-constant speed), adjusting the transit speed of the seats of the rolls in front of the input means and of the output means according to the rate with which the rolls come from the section upstream and to the rate with which these are requested by the section downstream of the storage unit respectively.

The various sections of the production line are controlled electronically by means of a programmable unit. This is capable of knowing the production rate of the re-reeling machine and of the gluing machine on the one hand and of the cropper on the other. On the basis of this information, it is possible to control the speed of the two motor units associated with the flexible member of the storage unit. When the production rate of the section upstream or downstream is modified, this implies a modification of the speed of one or of the other motor unit (or of both).

In practice, in storage units of this type, an input distributor and an output distributor are provided, which transfer a log individually from said first section to said storage unit and from said storage unit to the section downstream respectively. In this case, according to a perfected embodiment of the invention, it is possible to associate with said input distributor and with said output distributor respective sensor means which determine the number of rolls waiting upstream of the input distributor and downstream of the output distributor. The advance speeds of the two motor units, already proportional to the rates of the cropper and of the re-reeling machine (thanks to the information originating from the programmable control unit or in another suitable manner), are in this case further modified according to the number of rolls waiting to obtain even more accurate functioning and greater timeliness for intervention for the adaptation of the rate of charging and discharging of the rolls onto and from the storage unit.

Thus, if, for example, the re-reeling machine increases the speed of production, a greater number of rolls will leave the gluing machine per unit of time. These will accumulate upstream of the distributor for input into the storage unit. The sensor detects the increase in the number of rolls waiting and consequently brings about an increase in the speed of the first motor unit and of the input distributor for the purpose of avoiding the accumulation of an excessive number of rolls outside the storage unit. The opposite occurs if the re-reeling machine reduces its own speed. The same occurs in output in response to the working speed of the cropper. The control by means of the sensors is advantageously added to the control by means of the information on the production rate coming from the control unit of the re-reeling machine and of the cropper. This does not, however, exclude controlling the speeds of the two motor units only by means of the signals coming from the sensors. In this case, it will be necessary to provide a greater number of sensors upstream and downstream of the storage unit.

Further advantages and improvements of the storage unit according to the invention are described below.

BRIEF DESCRIPTION OF THE DRAWINGS

The invention will be better understood by following the description and the attached drawing which shows a practical non-limiting embodiment of the invention itself. In the drawing, FIG. 1 shows a lateral diagrammatic view of the accumulation storage unit;

FIG. 1A shows an enlargement of the lower zone of the storage unit;

FIG. 2A shows an enlargement of the discharge zone;

FIG. 2B shows an enlargement of the zone for charging the logs into the storage unit, and FIG. 3 shows diagrammatically a portion of the production line.

DESCRIPTION OF THE INVENTION

The production line in which the storage unit is inserted is partially represented in a diagrammatic manner in FIG. 3, in which R indicates the re-reeling machine, I the gluing machine, P the storage unit and T the cropper.

The storage unit has a frame 1 on which there are arranged four guide wheels for a flexible member 3 constituted by a pair of parallel chains. A first series of guide wheels, indicated by 5, 5A and 5B, is positioned in the upper zone of the frame 1. The wheels 5, 5A, 5B have fixed axles. A second series of guide wheels, indicated by 7, 7A and 7B, is positioned in the lower zone of the frame 1. The wheels 7, 7A and 7B have fixed axles but the wheels 7 have axles which are positionally adjustable to take up the play which is created during functioning as a result of the lengthening of the chains forming the flexible member 3. Adjusting screws 6 and locking screws 8 make this adjustment possible by moving the crosspiece 10 (see in particular FIG. 1A) on which the wheels 7 are supported. Two series of intermediate guide wheels, indicated by 9 and 11, are mounted on a moving element 13 which is vertically movable along two uprights 15 and 17.

In the simplified representation in FIG. 1, the path of one single chain forming the flexible member 3 is indicated; the second chain is arranged in a vertical plane parallel to the plane of the figure and is guided around guide wheels arranged according to the same configuration on the opposite side of the storage unit. Arranged between the two parallel chains, with constant spacing, are seats or troughs 19 with a V-shaped cross-section, only some of which are indicated in FIG. 1, while the others have been omitted for clarity of drawing. The troughs 19 are borne in an oscillating manner by the flexible member to discharge the rolls or logs L on an inclined surface 21 for charging the cropper T arranged downstream of the storage unit P.

23 indicates a first motor unit which operate the upward movement, according to f3, of the flexible member 3. The movement according to f3 is controlled so as to present the troughs 19 sequentially in front of the input zone of the logs L coming from the gluing machine I arranged upstream of the storage unit.

Provided in the input zone is a distributor 25 which, by rotating, allows the passage of one roll L at a time towards the flexible member 3 which—with a respective trough 19—acts to take each individual roll L and to transport it upwards.

The distributor 25 is actuated by a gear motor 26 (sketched in FIG. 2B) operated, by means of suitable timing delay, by a sensor 28 which detects the passage of each trough 19 to be charged. The timing delay (that is to say the delay between the emission of the signal by the sensor 28 and actuation of the gear motor 26) is variable automatically according to the speed of the motor unit 23. This makes the log L and the trough 19 arrive contemporaneously in the charging zone.

27 indicates a second motor unit which controls the movement downwards according to f3' of the discharge branch of the flexible member 3. In the downward movement according to f3' of the flexible member 3, each trough borne by the latter encounters a cam surface 29 which interacts with a feeler 31 on the trough 19 (FIG. 2) to bring about its oscillation and consequently the discharge of the log L onto the inclined surface 21. The cam surface 29 constitutes the means of discharge or of output of the rolls towards the cropper. The motor unit 27 is controlled so as to discharge the logs L onto the inclined surface 21 with a frequency according to the working speed of the cropper T downstream, the channels for advance of the log of which are indicated by 33.

The moving element 13 makes it possible to have different speeds for the two motor units 23, 27, so that the frequency of arrival of the logs at the gluing machine can be different from the frequency of discharge onto the inclined discharge surface 21. The troughs 19 borne by the flexible member 3 and positioned above the moving element 13 are full. Also full are the troughs arranged along the ascending branch on the charging side (on the left in the drawing) and along the descending frame on the discharge side (on the right in the drawing) above the inclined surface 21. The remaining troughs are empty. When the frequency of arrival of the rolls is greater than the discharge speed, the moving element 13 is lowered, increasing the number of full troughs and reducing the number of empty troughs. The opposite occurs when the request for logs by the cropper increases in relation to the number of logs arriving from the gluing machine.

The descending end branch (on the right in FIG. 1) of the flexible member is guided, apart from around the guide wheels 5B and 7B, also around two wheels 35, 37 with a fixed axles and a third wheel 39 borne (see in particular FIG. 2) by an oscillating arm 40, fulcrumed at 41 on the frame of the machine. Associated with the arm 40 is an actuator with a cylinder/piston 43, fulcrumed at 45 on the frame and at 47 on the axle of the guide wheel 39. The actuator 43 tends to make the arm 40 rotate in the anticlockwise direction, tensioning in this manner the flexible member 3. Although only one actuator 43 and only one oscillating arm 40 are visible in the simplified representation in the drawing, it is intended that a wheel 39 with the associated oscillating arm and the associated actuator is provided for each of the two parallel chains which form the flexible member 3 on each of the two sides of the storage unit.

During the functioning of the storage unit, the play which is generated on the flexible member 3 as a result of wear and which causes a lengthening of the member itself is taken up by the tensioner formed by the wheel 39, by the arm 40 and by the actuator 43, constantly under pressure, until the limit position of the wheel 39, indicated by 39X, is reached. In this position, which can be detected by a sensor means, for example a micro-switch 49, against which the actuator 43 or the arm 40 comes to bear, or a magnetic sensor acting directly inside the actuator 43, an alarm signal is emitted, and the production line is if necessary stopped until the operator has acted to adjust the position of the lower guide wheels 7, thus bringing the arm 40 into the initial position in FIG. 2.

The first motor unit 23 moves, by means of the wheel 7A, the flexible member 3 with continuous motion, at a speed which is determined and variable according to the rate with which the logs L come from the re-reeling machine R and from the gluing machine I. Correspondingly, the rotating distributor 25 rotates in an intermittent manner so as to deposit a roll L on each seat or trough 19 in transit. The adjustment of the speed of advance of the motor unit 23 and consequently of the rotation of the rotating distributor 25 can be obtained directly from the production data coming from the re-reeling machine R which is controlled by its own central unit. On the other hand, or in combination, sensor means 61 can be provided, which detect the number of logs L1, L2, L3 waiting on the chute 63 upstream of the rotating distributor 25. The speed of translation of the first ascending branch of the flexible member 3 and therefore the frequency of rotation of the rotating distributor 25 are modified according to the number of logs L1, L2, L3 waiting. If this number exceeds a predetermined number, the speed of the motor unit 23 and therefore the rate of the rotating distributor 25 are temporarily increased to bring the number of logs waiting back to the predetermined number. The opposite occurs if the number of logs L1, L2, L3 falls below a predetermined limit.

Similarly, in output—at the end of the inclined surface 21—a rotating distributor 22 is provided, which is operated by the cropper T according to its own production requirements. This allows the rhythmical passage of the logs to the cropper T. The speed of rotation of the second motor unit 27, which determines the frequency of discharge of the rolls onto the inclined surface 21, is also according to the operating speed of the cropper T. This speed can be detected directly from the data of the central control unit. In this case also, in addition or as an alternative to direct control by means of the operating speed of the cropper, which is known by the central unit, control of the speed of advance of the second motor unit 27 can be obtained by means of using sensor means 24 according to the number of logs L waiting on the inclined surface 21, with methods similar to those illustrated for control of the motor unit 23.

In this manner, regular functioning is obtained, without sudden unexpected starts and stops of the flexible member 3 and therefore with a considerable reduction in the dynamic stresses on the members of the machine. At the same time, a regular afflux of rolls to the cropper T is guaranteed, with consequent elimination of the risk of the absence of a roll in one or more of the working channels of the cropper and of the negative consequences on the functioning of the line which were pointed out above.

It is intended that the drawing shows only an exemplification given only by way of practical demonstration of the invention, it being possible for this invention to vary in form and arrangement without, however, leaving the scope of the concept which forms the invention itself. Any presence of reference numbers in the attached claims has the purpose of facilitating reading of the claims with reference to the description and to the drawing and does not limit the scope of protection represented by the claims.

I claim:

1. A storage unit for temporary storage of rolls, arranged between a first section and a second section of a production line and comprising:

an endless flexible member defining a closed path within said storage unit and bearing a plurality of seats for said rolls, said seats being subdivided into a first group of empty seats and a second group of full seats;

an input feeder for controlled distribution of rolls arriving from said first section to said seats of said first group;

an output feeder for controlled discharge of rolls from said seats of said second group toward said second section;

a first motor for advancing said seats of said first group toward said input feeder; and a second motor for advancing said seats of said second group toward said output feeder;

wherein said first motor and said second motor have first and second independently adjustable continuous speeds, respectively;

said first motor and said second motor move said flexible member at a continuous variable speed; and said first and second independently adjustable continuous speeds are adjusted based on a rate of roll arrival from said first section and a rate of roll request from said second section, respectively.

2. The storage unit of claim 1, wherein said input feeder includes an input distributor to transfer rolls individually from said first section to said storage unit, and said output feeder includes an output distributor to transfer rolls individually from said storage unit to said second section.

3. The storage unit of claim 2, wherein a first sensor is associated with said input distributor to count rolls waiting upstream of said input distributor and a second sensor is associated with said output distributor to count rolls waiting upstream of said output distributor, and wherein speed of advance of each of said first motor and said second motor is dependent on the number of rolls waiting upstream of said input distribution and said output distributor, respectively.

4. The storage unit according to claim 1 or 2, wherein said speed of each of said first motor and said second motor is adjusted based on signals received from each of said first section and said second section, respectively, said signals being based on a rate of production of each of said first section and said second section, respectively.

5. The storage unit of claim 2, further comprising a sensor capable of detecting passage of an empty seat in a predetermined position upstream of said input distributor, wherein said sensor emits an operating signal for actuation of said input distributor to transfer a roll into said empty seat, said actuation occurring with a delay in relation to emission of said signal, said delay being dependent on the speed of said first motor.

6. The storage unit of claim 1, 2, or 3, wherein said flexible member bears a plurality of oscillating seats and is guided by two external series of fixed wheels and two internal series of movable wheels, said two internal series being movable to modify a length of a piece of said flexible member bearing said first group of seats in relation to a length of a piece of said flexible member bearing said second group of seats.

* * * * *